United States Patent [19]

McDowell et al.

[11] Patent Number: 4,917,825

[45] Date of Patent: Apr. 17, 1990

[54] SOLVENT COMPOSITION AND PROCESS FOR THE ISOLATION OF RADIUM

[75] Inventors: William J. McDowell, Knoxville; Gerald N. Case, Oak Ridge, both of Tenn.

[73] Assignee: The United States of America, as represented by the Department of Energy, Washington, D.C.

[21] Appl. No.: 253,634

[22] Filed: Oct. 5, 1988

[51] Int. Cl.[4] .......................... G21F 7/08; C09K 3/00

[52] U.S. Cl. .................................... 252/631; 252/184; 423/2; 423/DIG. 14

[58] Field of Search .......................... 423/2, DIG. 14; 252/631, 187

[56] References Cited

U.S. PATENT DOCUMENTS

| | | | |
|---|---|---|---|
| 3,914,373 | 10/1975 | Jepson | 423/2 |
| 4,186,175 | 1/1980 | Tomaja | 423/10 |
| 4,238,294 | 12/1980 | Takeuchi et al. | 423/DIG. 14 |
| 4,282,192 | 8/1981 | Larson | 423/2 |
| 4,460,747 | 7/1984 | Blasius et al. | 210/679 |
| 4,477,377 | 10/1984 | Izatt et al. | 252/631 |
| 4,654,200 | 2/1987 | Nirdosh et al. | 423/2 |
| 4,681,705 | 7/1987 | Robertson | 252/631 |
| 4,726,938 | 2/1988 | Rollat et al. | 423/DIG. 14 |
| 4,749,518 | 6/1988 | Davis et al. | 423/2 |
| 4,800,024 | 1/1989 | Elfline | 210/665 |
| 4,849,505 | 7/1989 | Stavrianopoulos | 423/6 |

*Primary Examiner*—Edward A. Miller

*Attorney, Agent, or Firm*—Katherine P. Lovingood; Stephen D. Hamel; William R. Moser

[57] ABSTRACT

A solvent extraction composition for radium including a high molecular weight organophilic carboxylic acid and an organophilic macrocycle dissolved in a suitable solvent.

9 Claims, 1 Drawing Sheet

SOLVENT COMPOSITION AND PROCESS FOR THE ISOLATION OF RADIUM

BACKGROUND OF THE INVENTION

The subject matter of the present invention relates to a novel solvent extraction system and more specifically to a composition and method for the selective separation and isolation of radium in a solvent extraction process. The Government has rights in this invention pursuant to Contract No. DE-AC05-840R21400, Budget No. KC 03 02 02 0, awarded by the U.S. Department of Energy.

Radium is one of the alkaline earth elements in Group IIA of the periodic table and generally behaves similarly to the other member elements of this group. Its reactions are very similar to what ca be expected of barium, strontium and calcium, for example. As a result, separation of radium from these common elements has proven to be difficult. For example, precipitating agents that precipitate radium will also precipitate barium, strontium and calcium. Similarly, solvent extraction or ion exchange resins that extract or absorb radium also extract or absorb barium, strontium and calcium in various degrees.

There is presently widespread need in analytical, environmental and industrial chemistry for a simple efficient method of isolating radium from their related elements with which it usually is found. While no previous solvent extraction system is known that might be selective for radium, there has been reported by Joshi and Padmanabhan a radium-selective ion exchange resin and by Brass and Dodge the selective absorption of radium by manganese dioxide on glass fibers. However, neither of these methods appear to provide a clean separation of radium from its related elements. The most commonly used separation of radium is by co-precipitation with barium sulfate. The precipitate formed is dissolved by ethylenediamine tetraacetic acid (EDTA), the EDTA destroyed and the barium and radium separated by chromatography on a cation exchange column. There has also been reported a separation process of radium from a sulfonic acid cation exchange column using cyclohexylenediamine tetraacetic acid by Gleason. However, while the above methods might provide clean separation they are difficult and time consuming.

Selective extraction of radium by an organic system allows for more rapid and simple manipulation in the separation process which enables effective adaptation to a continuous, remote process for sequestering or otherwise separating the radium. Such a process would also allow for direct use of liquid scintillation spectrometry to assay for radium when it is separated from its daughters and from the uranium-238 decoy chain in general. Thus, while there are some more complex systems available for separating radium they are not without their disadvantages and it would be more desirable to have an effective solvent extraction system in preference to the presently known systems.

SUMMARY OF THE INVENTION

Therefore, it is an object of the present invention to provide a solvent extraction system for radium which will overcome the above-noted disadvantages.

It is a further object of the present invention to provide a composition that will act as a selective extractant for radium.

A further object of the present invention is to provide a method for extracting radium from its related elements and compounds thereof.

It is still a further object of the present invention to provide a novel radium solvent extraction system.

It is another object of the present invention to provide a method for extracting or separating radium from calcium, strontium and barium.

The foregoing objects and others are accomplished in accordance with the present invention generally speaking by providing a solvent composition that will extract or otherwise selectively separate radium from other elements and compounds, more specifically those elements and compounds thereof most closely related to radium in the periodic table. The extraction medium utilized comprises a high molecular weight organophilic carboxylic acid and an organophilic macrocycle dissolved in a suitable solvent such as toluene. The resulting solvent composition forms a synergistic extractant mixture, i.e. one in which the extraction effect obtained by the mixture is greater than the sum of the effects produced by the components used separately, that selectively sequesters or separates radium from other elements, such as calcium, strontium and barium closely associated with radium. The organophilic carboxylic acid utilized is in the molecular weight range of from 250 to 500. The crown ether, in addition to possessing the optimum ring size, must have sufficient and appropriate organophilic substituents.

Radium, being one of the alkaline earth elements in Group IIA of the periodic table behaves similarly to other members of this group. Its reactions are very similar to those of barium, strontium and calcium. Thus, separation from these common elements, as well as compounds thereof, is very difficult. Precipitating agents that normally precipitate radium also precipitate barium, strontium and calcium. There is presently widespread need in analytical, environmental and industrial chemistry for a simple efficient method of isolating radium from these elements with which it usually occurs. It has been determined in the course of the present invention that the particular solvent composition hereof selectively separates radium from its related elements and compounds.

DETAILED DESCRIPTION

In accordance with the present invention a solvent composition is provided for the separation of radium from other elements and compounds and more particularly for the separation of radium from those specific elements and compounds intimately related thereto, as taken from the periodic table, by solvent extraction. The solvent composition comprises an organic solvent extractant that selectively removes or phase-transfers radium from, for example, a basic aqueous solution of barium, strontium and calcium. The conditions for effective radium extraction will be those in which the aqueous solution exhibits a pH of from 7 to 14 when in contact with the organic solvent extractant composition. The radium-selective extractant comprises a solution of a mixture of a high molecular weight organophilic carboxylic acid and an organophilic macrocyle dissolved in a suitable hydrocarbon solvent or diluent. The resulting composition forms a synergistic extractant mixture selective for radium.

Any suitable organophilic carboxylic acid having a molecular weight greater than 250 with the desired solubility characteristics may be used in the course of the present invention. Such organophilic carboxylic acids must, in combination with the appropriate crown ether, exhibit a selectivity for radium. Typical carboxylic acids include 2-methyl-2-heptyl-nonanoic acid, 2-dodecyl-2-methyl-tetradecanoic acid, purified neo-bottoms (EXXON), versatic acid-1519 (SHELL) tripentyl acetic acid, and Di-n-heptylacetic acid. Higher molecular weight and more highly branched carboxylic acids are preferred in that they have the advantage of lower loss to the aqueous phase and less emulsion problems in the two phase equilibration. In some instances, the use of a specific class of organophilic caroboxylic acids, such as a beta difluorinated carboxylic acid will yield an extraction system capable of extracting radium from a lower pH or even an acid solution.

Any suitable organophilic macrocyclic compound may be used in the course of the present invention. Typical macrocyclic compounds include 2-dicyclohexano-21-crown-7 (DC21C7), and the same compound with various alkyl substituents on the cyclohexano groups. In addition, alkyl substituents other than the cyclohexo groups are suitable. Such a compound includes the 21-crown-7 moiety with branched alkyl substituents. Substitution of as many as two nitrogen atoms for oxygen is also considered to be a useful structure for the synergist component of the present invention.

It is important that both the carboxylic acid and the macrocyclic component of the solvent composition be highly organophilic and that the resulting complex with radium be organic-phase soluble. In addition, it is further important that the macrocyclic compound have a cavity of a size such that the radium ion will fit therein. That is, the covalent diameter of the cavity formed in the expanded crown ether ring should be approximately that of the crystal ionic diameter of radium, 2.8 A.

BRIEF DESCRIPTION OF THE DRAWINGS

The invention is further described with respect to the following figures wherein.

Figure 1:
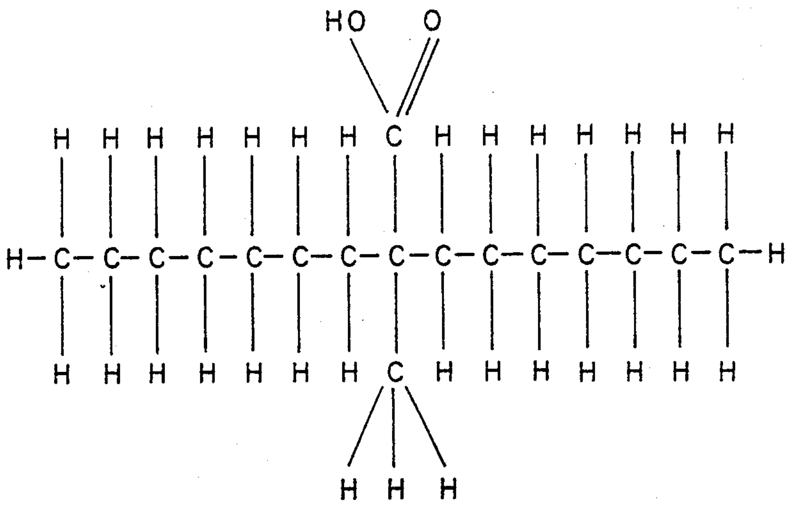
FIG. 1 represents a structural scheme of a specific carboxylic acid used in accordance with the present invention.

Referring now to the Figs., one carboxylic acid of demonstrated effectiveness is represented by the structure shown in FIG. 1, i.e. a neocarboxylic acid, 2-methyl-2-heptyl-nonanoic acid.

Figure 2:
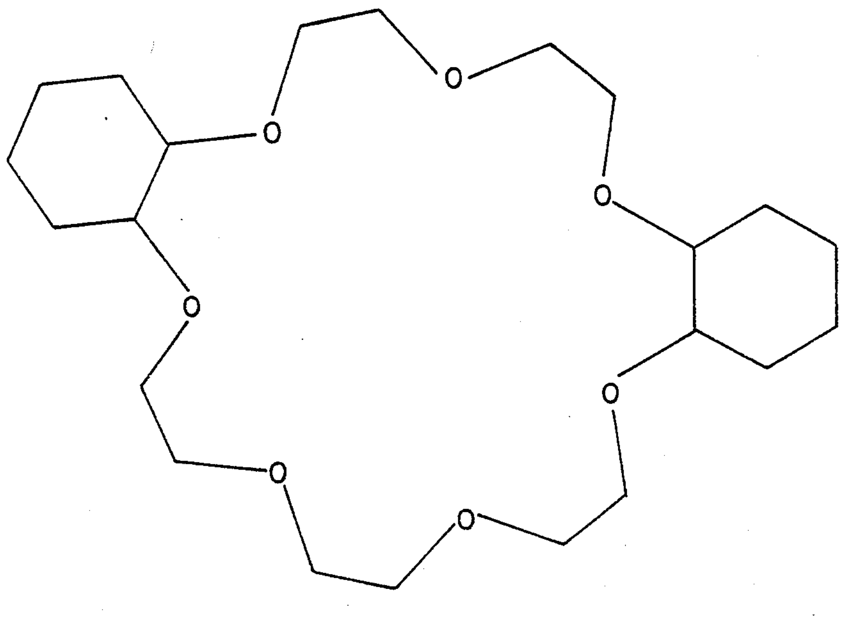
FIG. 2 is a skeleton-type structural scheme of a specific macrocycle used in the course of the present invention.

The macrocyclic compound structure demonstrated in FIG. 2 is dicyclohexano-21-crown-7 (DC21C7) an organophilic crown ether macrocycle. In this skeleton-type structure, each vertex indicates a carbon with the appropriate number of hydrogen atoms attached.

PREFERRED EMBODIMENTS

To further define the specifics of the present invention the following examples are intended to illustrate but not limit the subject matter of the present invention. Parts and percentages are by weight unless otherwise indicated.

EXAMPLE I

Two ml of a toluene solution containing 0.05 moles per liter of dicyclohexano-21-crown-7 (DC21C7) and 0.075 moles per liter of the neocarboxylic acid, 2-heptyl-2-methyl-nonanoic acid (HHMN), were contacted for 1 minute with an equal volume of aqueous solution by shaking in an 8 ml vial. The initial aqueous phase contained radium ion in an amount sufficient to give 52,000 disintegrations per minute per ml, barium nitrate equal to 10 mg of barium, 0.5 moles per liter of sodium nitrate, and sodium hydroxide sufficient to adjust the equilibrium pH (after contact with the organic phase) to 10.2. After equilibration and separation of the two phases, the ratio of radium in the organic phase to radium in the aqueous phase (distribution coefficient) was 1157 and the distribution coefficient for barium was 203. Radium was extracted quantitatively, and with the ratio of distribution coefficients, 1159/203=5.7, it is observed that radium extraction would still have been quantitative with a larger amount of barium present.

EXAMPLE II

In similar equilibrations to that of example I, the organic phase contained 0.1 moles per liter of a commercially available neocarboxylilc acid from Shell Chemical Company, (Versatic Acid 1519), and 0.05 moles per liter of DC21C7, and the aqueous phase contained 0.5 moles per liter of cesium nitrate and 0.01 moles per liter each of barium, strontium and calcium nitrates, with the addition of cesium hydroxide to produce an equilibrium pH of 9.5. The distribution coefficient for radium was found to be 100, that of barium 3.0, that of strontium approximately 0.8 and that of calcium approximately 0.5.

EXAMPLE III

Extractions were performed in the same way as in example I using for the organic phase a solution containing 0.1 moles per liter of the HMHN neocarboxylic acid and 0.05 moles per liter of DC21C7 together with an aqueous phase containing 0.5 moles per liter of sodium nitrate, and 0.001 moles per liter of Ba, Sr, Ca, Mg, Be, Zn, Li, Cs, Th, and U. Sufficient sodium hydroxide was added to adjust the equililbrium pH to $>10$. These extractions produced distribution coefficients of 600 for radium with separation factors from the other elements given in Table 1.

TABLE 1

| RADIUM SEPARATION FACTORS | |
|---|---|
| RADIUM FROM | SEPARATION FACTOR |
| Barium | 9.3 |
| Strontium | 12.3 |
| Calcium | 58.2 (Approx.) |
| Magnesium | 564 (Approx.) |
| Beryllium | $2 \times 10^6$ (Approx.) |
| Zinc | $7 \times 10^6$ |
| Lithium | $8 \times 10^3$ (Approx.) |
| Cesium | $1.9 \times 10^5$ |
| Thorium | $3.7 \times 10^6$ |
| Uranium | $6.2 \times 10^6$ |

In each of the above examples, the radium was extracted essentially quantitatively.

The crown ether dicyclohexano-21-crown-7 used in the above examples is available commercially from Aldrich Chemical Co., Milwaukee, Wis., and from Parish Chemical Co., Orem, Utah.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A solvent composition for extracting radium which comprises a high molecular weight organophilic carboxylic acid and an organophilic macrocycle.

2. The solvent extraction composition of claim 1 wherein said organophilic carboxylic acid component has a molecular weight greater than 250.

3. The composition of claim 2 wherein said molecular weight ranges from 250 to 500.

4. The composition of claim 1 wherein said organophilic carboxylic acid is tri-substituted on the beta carbon.

5. The composition of claim 1 wherein said organophilic carboxylic acid comprises 2-methyl-2-heptylnonanoic acid.

6. The composition of claim 1 wherein said organophilic macrocyclic compound comprises an organophilic crown ether macrocycle.

7. The composition of claim 6 wherein said organophilic macrocycle comprises -dicyclohexano-21-crown-7.

8. The composition of claim 1 wherein said macrocyclic compound has a cavity of a size such that the radium ion will fit therein.

9. A solvent extraction process for the selective separation and isolation of radium which comprises, providing a solvent phase extraction composition comprised of an organophilic carboxylic acid and an organophilic macrocycle component, mixing said composition with an aqueous phase containing said radium, said aqueous phase having a pH of greater than 7 until a state of equilibration is reached between the two said phases and separating said organic solvent phase containing said radium from said basic aqueous phase.

* * * * *